United States Patent [19]

Gray

[11] Patent Number: 5,023,125
[45] Date of Patent: Jun. 11, 1991

[54] FASTENING MEANS FOR CUSTON-FIT SEAT COVERS

[75] Inventor: Jordan B. Gray, Newport Beach, Calif.

[73] Assignee: Nouveaux Corporation, Irvine, Calif.

[21] Appl. No.: 384,501

[22] Filed: Jul. 24, 1989

Related U.S. Application Data

[63] Continuation-in-part of Ser. No. 250,386, Sep. 28, 1988.

[51] Int. Cl.$^5$ .................................. B32B 3/06
[52] U.S. Cl. .................................. 428/100; 150/158; 297/218; 297/219; 297/DIG. 6; 428/304.4
[58] Field of Search .............................. 428/100, 304.4; 150/158; 297/DIG. 6, 218, 219, 220

[56] References Cited

U.S. PATENT DOCUMENTS

| | | | |
|---|---|---|---|
| 3,185,197 | 5/1965 | Spiro et al. | 428/100 X |
| 3,248,147 | 4/1966 | Testa | 428/100 X |
| 3,295,577 | 1/1967 | Danielson | 428/100 X |
| 3,308,490 | 3/1967 | Cacioppo | 428/100 X |
| 3,310,091 | 3/1967 | Geisen et al. | 428/100 X |
| 3,654,059 | 4/1972 | Zisblatt | 428/137 X |

OTHER PUBLICATIONS

Brochure Describing, "Tempo" Fabric Published for Morgan Fabrics, 4265 Exchange Avenue, Los Angeles, Calif. 90058 (undated).

*Primary Examiner*—Henry F. Epstein
*Attorney, Agent, or Firm*—Price, Gess & Ubell

[57] ABSTRACT

Seat covers for motor vehicle seats and the like are made from a relatively inelastic material that is soft to the touch, but durable. Such material would include leather or imitation leather material. Each seat cover is custom made for a certain style and size of seat, generally in two or three pieces, one to cover the back, one to cover the bottom, and one to cover the headrest. The pieces have fastening means attached at their respective openings which include the hook part of a Velcro fastener and the loop part of a Velcro fastener. Alternatively, the seat cover material itself may serve as the loop part. Suitable material for this purpose can be purchased under the trade name "TEMPO." The back cover, the bottom cover and the headrest cover are snugly adjusted by this fastening means on installation and throughout the life of the seat cover.

9 Claims, 4 Drawing Sheets

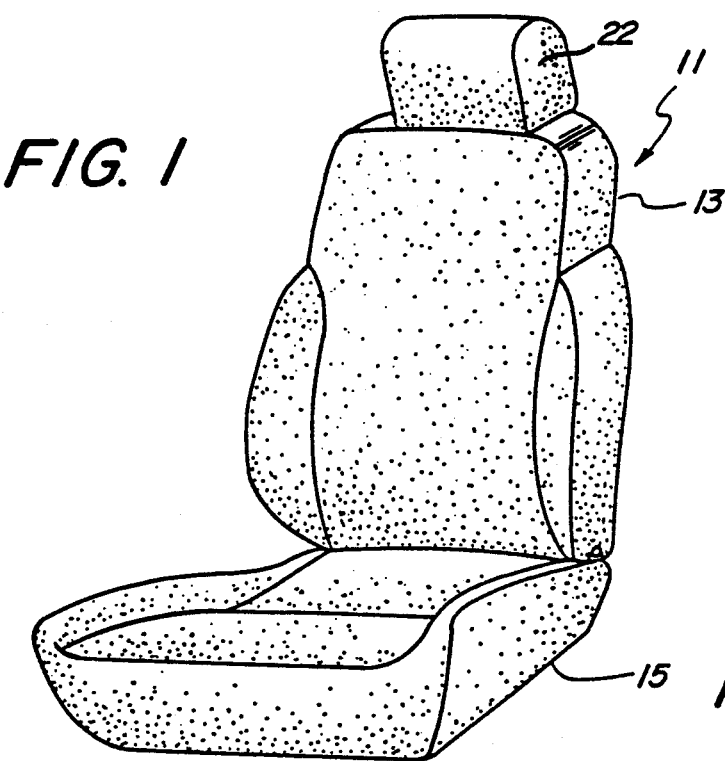
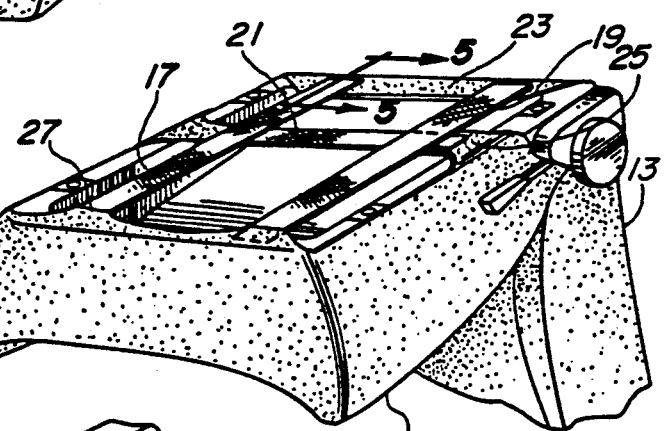
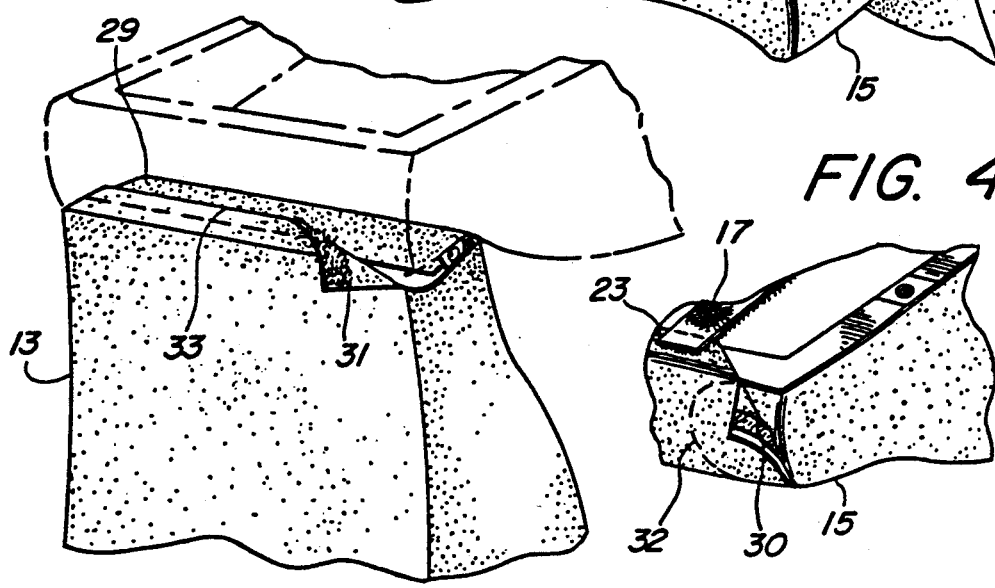
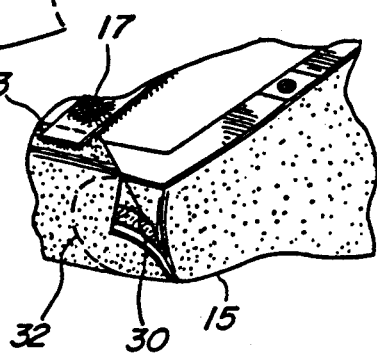

FASTENING MEANS FOR CUSTON-FIT SEAT COVERS

This is a continuation-in-part of application Ser. No. 250,386, filed Sept. 28, 1988.

BACKGROUND OF THE INVENTION

1. Field of the Invention

The present invention relates generally to improvements in seat covers, and more particularly pertains to new and improved fastening means for seat covers utilized in motor vehicles.

2. Description of the Prior Art

In the field of motor vehicle seat covers, it has been the practice to employ elasticized stretchy material from which the seat cover is manufactured. The result is that the seat covers seldom appear to be tight-fitting and custom even at the time of initial installation. Then, as the elasticized fibers in the material begins to lose their resiliency, the seat covers become even more baggy and ill-fitting. In addition, the inferior fastening means utilized with prior art seat covers are typically stretchy elastic bands and hooks which cannot keep the seat cover in place during use, resulting in a rumpled and baggy appearance at all times. Moreover, the prior art fastening means are incapable of providing for fastening adjustment, and are readily visible and unsightly.

SUMMARY OF THE INVENTION

A relatively inelastic, soft, but durable material is custom cut and made into covers for motor vehicles. Separate covers are made for the headrest, seat back, and seat bottom. Each cover is held fast by pulling into position a hook pile fastening portion of material sewn or otherwise attached to a flap extending from the cover material and pressing it against a loop pile fastening portion of material sewn or otherwise attached to an opposing flap also extending from the cover fabric. Alternatively, where the seat cover material itself has a loop-type structure, the hook portion may be pressed directly against the seat cover material. The fastening means is not visible, creating an attractive, custom-tailored appearance.

BRIEF DESCRIPTION OF THE DRAWINGS

The objects and many of the attendant advantages of this invention will be readily appreciated as the same becomes better understood by reference to the following detailed description when considered in conjuction with the accompanying drawings, in which like reference numerals designate like parts throughout the figures thereof, and wherein:

FIG. 1 is a three-dimensional perspective of an automobile seat with the seat covers of the present invention installed;

FIG. 2 is a three-dimenional perspective of the bottom part of the seat cover installed showing a first preferred fastening means;

FIG. 3 is a three-dimensional perspective of the backrest from the bottom showing the first preferred fastening means for the backrest;

FIG. 4 is a sectional perspective showing the first preferred fastening means for the bottom of the seat cover;

DETAILED DESCRIPTION OF THE PREFERRED EMBODIMENTS

Figures 5, 6:
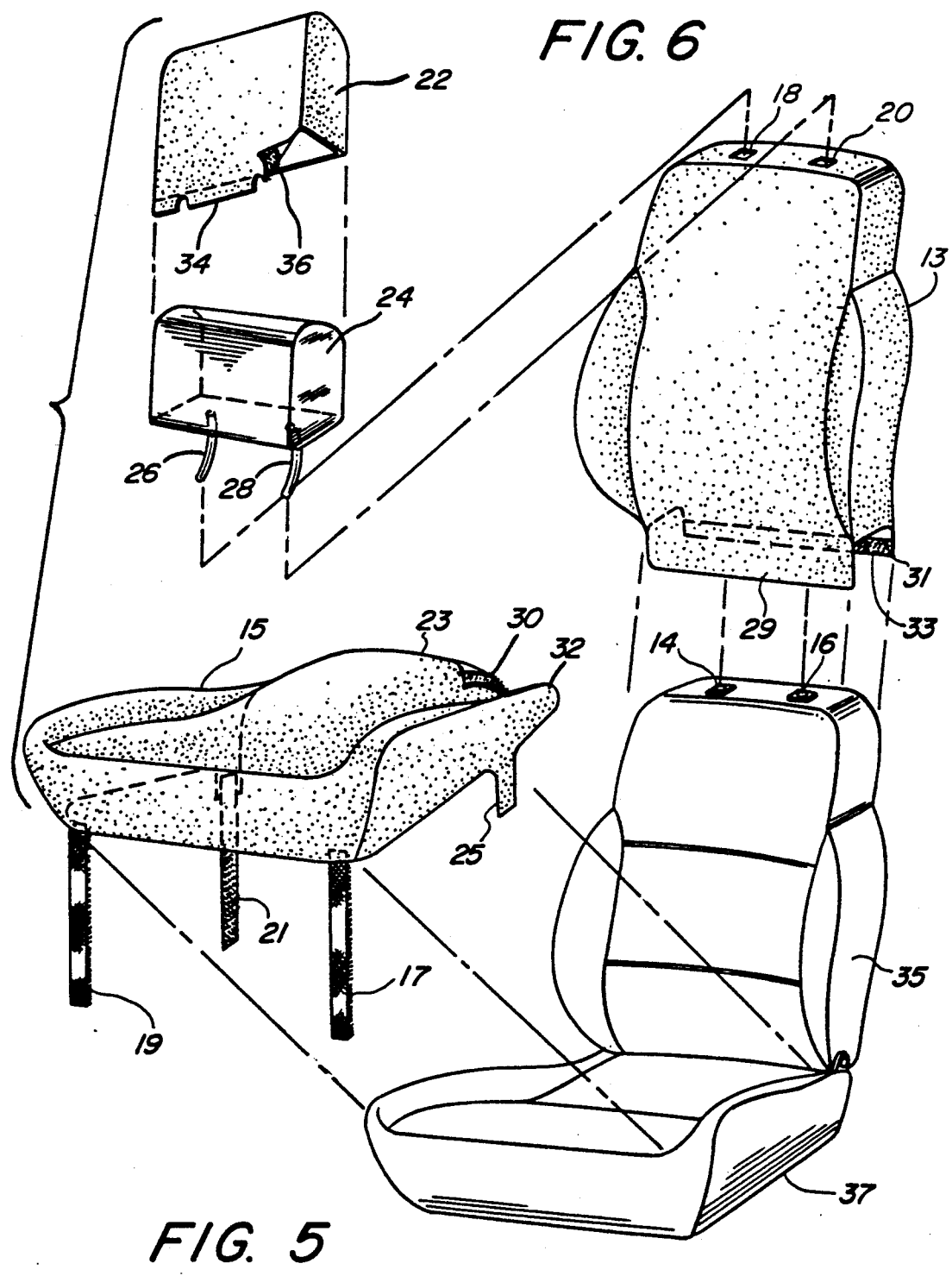
FIG. 5 is a cross-section along 5—5 of FIG. 2 showing the material and the first preferred fastening means in an engaged position.
FIG. 6 is an exploded perspective view showing the automobile seat and the cover sections therefor, the cover sections employing the first preferred fastening means.

FIG. 1 illustrates the seat cover 11 of the present invention installed on an automobile seat. The seat cover 11 has a back portion 13, a bottom portion 15 and a headrest portion 22. As is illustrated in FIG. 1, the fit of the seat cover, both the back portion 13, the bottom portion 15, and the headrest portion 22 is as good as that of the original equipment. This is the result of the material utilized, a material that is substantially inelastic, is extremely durable, and has a laminate structure. The preferred fabric is 100% nylon or polyester on the wear surface with a polyester foam core and a tricot backing. A fabric of this type is sold under the trade name "TEMPO" by various distributors, and is made by Guilford Mills of Greenville, N. C. .

FIGS. 2 to 5 illustrate one possible embodiment of a fastening mechanism according to the present invention. Referring to FIG. 2, the reason for the custom fit of the bottom part 15 on the automobile seat is illustrated. The fastening mechanism of the present invention is the main reason. The manner in which the bottom cover 15 attaches to the seat bottom 37 of the seat is more clearly illustrated in the expanded view of FIG. 6. Before the bottom portion 15 is applied to the seat bottom 37, it can be seen that a plurality of hook pile fastening straps 17, 19 and 21 are sewn to the bottom portion 15 at various points along its edge. In addition, a side tab of material 25 is cut into the bottom portion 15 at one side, while a back tab of material 23 is provided for at the back side of bottom portion 15. Two straps 17 and 19 are attached to the front of the bottom portion 15 opposite the back side tab 23. The other strap 21 is attached to the side of bottom portion 15 towards the back end in line with side tab 25. The back tab of material 23 has a hook pile fastening portion 30 sewn thereon at one end. This fastening portion overlays a pair of backward-extending side tabs 32 that are tucked under upon installation. Once the seat portion 15 is on the bottom seat 37, the hook pile fastening tab 21 is pulled tight and fastened to extending tab 25 on the opposite side. Tabs 25 and 32 are pieces of the seat cover material itself, the seat cover material having a loop pile construction. This allows the hook pile fastening material on tab 21 an unlimited degree of adjustability.

The two hook pile fastening straps 17 and 19 attached to the front of the bottom portion 15 by being sewn to the underside of the front material 27. The tabs 17 and 19 are pulled tight and overlap the back seat cover material tab 23. Here again, a wide latitude of adjustability is provided because the straps 17 and 19 simply engage and fasten to the upholstery material 23. Hook pile fastening strap 30 on back seat cover tab 23 overlays back side tab 32 and holds it snug.

The manner in which the backrest portion 13 of the seat cover fits onto the back 35 of the seat is illustrated in FIGS. 3 and 6. As can be seen in FIG. 6, the backrest portion 13 simply slips over the back 35. The apertures 18 and 20 and backrest portion 13 fit around the boss frames 14 and 16 in the backrest 35, thereby providing a custom fit and appearance at the top. Once the backrest portion 13 is slid over the back 35, the front flap 29 is turned under. The back flap 33, having a hook pile fastening strap 31 sewn on its edge, is pulled tight to overlay flap 29 and fasten thereto. Here again, a large latitude of adjustability is provided to adjust the tightness of the fit on installation and during the life of the cover, as the material wears with age.

Referring now to FIG. 4, it can be seen that the strap 17 includes a hook pile fastening portion. This type of material is illustrated and described in U.S. Pat. No. 2,717,437 issued Sept. 13, 1955. The material portion 23 to which the fastening strap attaches is the seat cover material itself. The seat cover material allows the fastening strap to fasten to it. The back tab 23 is shown overlying one of the side tabs 32. The hook pile fastening portion 30 holds side tab 32 snug, thereby contributing to the custom appearance of the seat cover throughout its life.

FIG. 5 illustrates, in cross-section, the fastening means and the seat cover material structure of the present invention. The cross-section is taken along 5—5 of FIG. 2. The hook pile fastening strap 17 which overlays the nylon loop pile material 39 is shown to have a plurality of hook members 10 attached thereto which engage the cloth loop material 39. FIG. 5 illustrates the preferred embodiment of the seat cover material 23 as being a material which is a laminate of a nylon wear surface 39 with a polyester foam core 41 sandwiched between the wear surface 39 and a tricot cloth 43. This type of material is sold under the trade name "TEMPO." This type of material is relatively inelastic, has exceptional durability characteristics, is highly stain-resistant, and has a Class A fire rating. Its breaking strength, tear strength, percentage shrinkage and durability all exceed, by many factors and degree the NAFM requirements.

FIG. 6 is also shown more clearly how the headrest cover 22 fits over the headrest 24 and fastens thereto. The headrest 24 has a pair of support rods 26, 28 extending therefrom which slip into the apertures within box frames 14 and 16, as is common for seats of this type. The headrest cover 22 is custom cut to fit this headrest. It has a closure flap 34 at one end of the opening. A loop pile fastening strap 36 is sewn along the width of the flap 34. When the cover is on the headrest the flap 34 is pulled tight to overlay the material with the strap 34. The strap 34 closes the cover underneath the headrest at the support rods 26, 28. When installed, the closure for the headrest is unobtrusive and presents a very clean line.

FIGS. 7 to 10 illustrate an alternative second embodiment of the seat cover of the present invention installed on an automobile seat. As in FIg. 6, the seat cover 11 has a back portion 13, a bottom portion 15 and a headrest portion 22. As is suggested by FIG. 1, the fit of the back portion 13, the bottom portion 15, and the headrest portion 22 may be as good as that of the original equipment, even when the seat cover components 13, 15, 22 are made of leather or a leather-like material.

The alternative embodiment of the fastening mechanism will now be described with reference to FIGS. 7 to 10. Before the bottom portion 15 is applied to the seat bottom 37, it can be seen that a plurality of hook pile fastening strap 17, 19, 21 are sewn to the bottom portion 15 at various points along its edge. In addition, a side tab of material 25 is cut into the bottom portion 15 at one side, while a back tab of material 23 is provided for in the bottom portion 15 at a back side. Two of the hook pile fastening straps 17, 19 are attached to the front of the bottom portion 15. The hooks of straps 17, 19 are opposite to loop pile fastening patches 70, 72 attached to the back side flap 23. The hook pile fastening strap 21 is attached to the side of bottom portion 15 towards the back end and in-line with extended tab 25 having a cloth patch 76 attached thereto. Once the seat portion 15 is placed over the bottom seat 37, hook pile fastening strap 21 is pulled tight to the opposite side and fastened to the loop pile patch 76 of extending tab 25. As in the first embodiment, this allows the tab 21 a virtually unlimited degree of adjustability.

Figure 8:
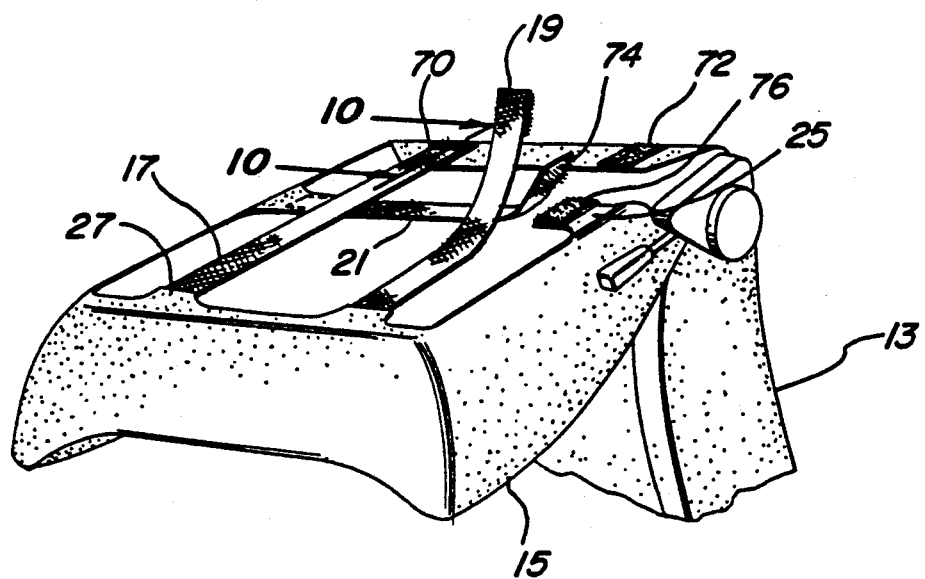
FIG. 8 is a perspective view of the bottom part of the seat partially installed showing the second preferred fastening means.
Figure 9:
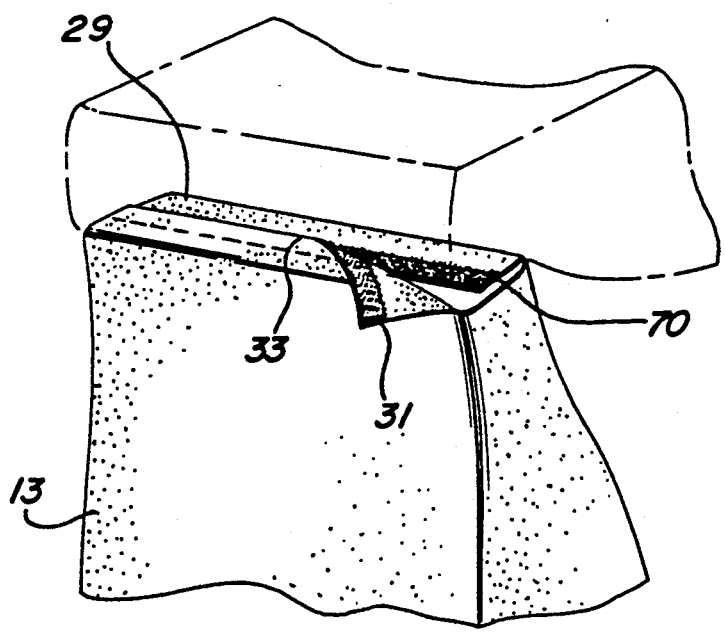
FIG. 9 is a three-dimensional perspective of the backrest from the bottom showing the second preferred fastening means for the backrest.

The two hook pile fastening straps 17, 19, attached to the front of the bottom portion 15, are sewn to the underside of the front material 27. As best shown in FIG. 8, the straps 17, 19 are pulled tight so as to overlap the loop pile patches 70, 72 sewn to the back side flap 23 of the seat cover. Here again, a wide latitude of adjustability is provided because any portion of the hook pile fastening straps 17, 19 may engage and fasten to the loop pile patches 70, 72.

Figure 7:
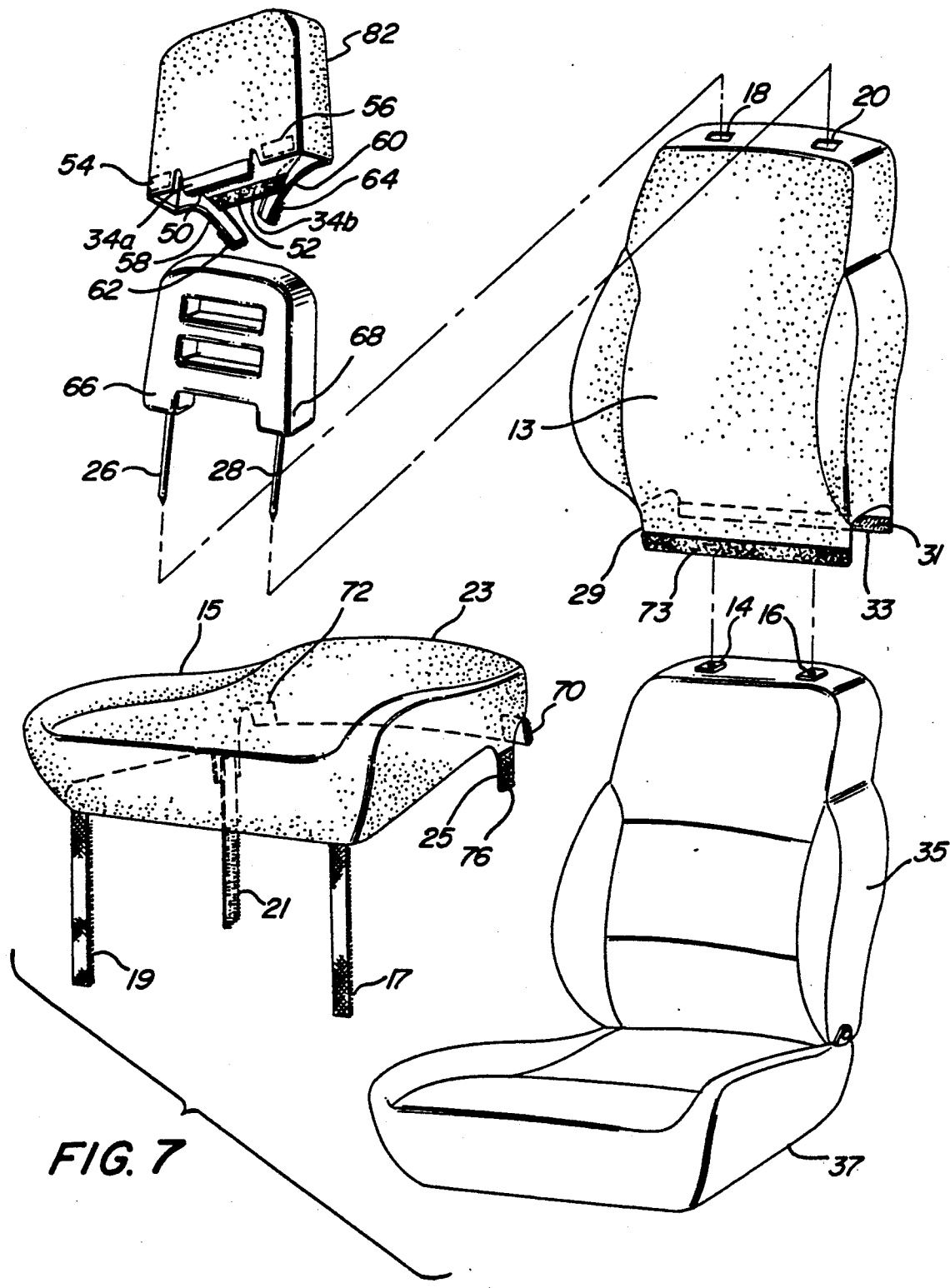
FIG. 7 is an exploded perspective view showing the automobile seat and sections of the seat cover employing a second preferred fastening means.

FIG. 7 shows an alternative headrest cover 82 which fits over the headrest 84 and fastens thereto. The headrest 84 has a pair of support rods 26, 28 extending therefrom which slip into the apertures within box frames 14, 16, as is common for seats of this type. The headrest cover 82 is custom cut to fit this particular style of headrest. The headrest cover 82 has undersides flaps 34a, 34b. A hook pile fastening strip 50 is attached to the inside of flap 34a and a loop pile fastening strip 52 is attached to the outside of flap 34b so as to engage flap 34a when the flaps are pressed together under the headrest 82. The headrest cover 82 also includes wraparound straps 58, 60, each having a patch of hook pile fastening material 62, 64 attached respectively thereto. When installed, the straps 58, 60 are wrapped tightly around the downward-extending base portions 66, 68 of the headrest 82 so that the hook pile patches 62, 64 engage the opposing loop pile patches 54, 56 sewn or otherwise attached to the interior of the headrest cover 82. When installed, the headrest cover 82 provides a tight custom fit and unobtrusive enclosure.

In this second embodiment, the backrest portion 13 simply slips over the back 35. The apertures 18, 20 and backrest portion 13 fit around the boss frames 14, 16 in the backrest 35, thereby providing a custom fit and appearance at the top. Once the backrest portion 13 is slid over the back 35, the front flap 29, having a hook pile fastening strip 73 sewn on its edge, is turned under. The back flap 33, having an opposing loop pile fastening strip 31 sewn on its edge, is pulled tight to overlay the strip 73 of flap 29 and fasten thereto.

Figure 10:
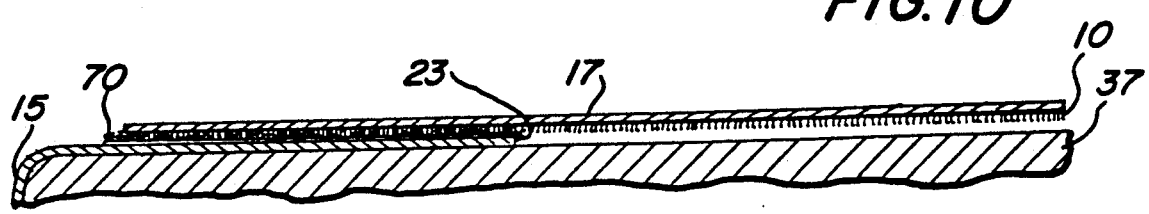
FIG. 10 is a cross-section along 10—10 of FIG. 8 showing the hook side and the loop side of the second preferred fastening means in an engaged position.

FIG. 10 illustrates, in cross-section, the alternative fastening means employed in the embodiment shown by FIGS. 7 to 10. The cross-section is taken along 10—10 of FIG. 8. The hook pile fastening strap 17 is shown to have a plurality of hook members 10 that engage the loop pile fastening patch 70 attached to a flap 23 of the material that makes up the seat cover 15. The hook-type and loop-type portions could, of course, be reversed in any of the above arrangements.

Coupling a cover material with one of the alternative fastening means of the present invention provides adjustability upon installation and throughout the life of the cover and for a seat cover of exceptional quality and appearance when installed.

What is claimed is:

1. An improved seat-bottom cover for covering a seat-bottom, the improvement comprising:
    a cover material, the cover material being shaped so as to snugly fit over the seat bottom;
    a back-flap extending from a back side of the cover material;
    at least one elongated front-strap fastened to and extending from a front side of the cover material so as to oppose the back-flap underneath the seat-bottom, the elongated front-strap having a pile fastening structure thereon for engaging the back-flap;
    a side-flap extending from one side of the cover material; and
    an elongated side-strap fastened to and extending from the other side of the cover material so as to oppose the side-flap underneath the seat-bottom, the elongated side-strap having a pile fastening structure thereon for engaging the side-flap.

2. The improved seat-bottom cover of claim 1 wherein the seat cover material itself has a loop pile fastening structure and wherein the front-strap and the side-strap have a hook pile fastening structure.

3. The improved seat-bottom cover of claim 1 wherein the back-flap and the side-flap each have a loop pile fastening patch fastened thereto and wherein the front-strap and the side-strap have a hook pile fastening structure.

4. The improved seat-bottom cover of claim 3 wherein the patches fastened to the back-flap and the side-flap have a hook pile fastening structure and wherein the front-strap and the side-strap each have a loop pile fastening structure.

5. An improved seat-back cover for covering a seat-back, the improvement comprising:
    a cover material defining a cylinder having a substantially rectangular cross section with an open end and a closed end, the cover material being shaped so as to snugly fit over the seat-back when pulled thereover:
    a first flap extending from a first side of the open end of the cover material, the first flap having a patch with a pile fastening structure attached thereto; and
    a second flap extending from a second side of the open end of the cover material so as to oppose and engage the first flap underneath the seat-back.

6. The improved seat-back cover of claim 5 wherein the seat cover material itself has a loop pile fastening structure and wherein the the patch attached to the first flap has a hook pile fastening structure.

7. The improved seat-back cover of claim 5 wherein the patch attached to the first flap has a hook pile fastening structure and wherein the second flap further includes a patch having a loop pile fastening structure fastened thereto.

8. The improved seat-back cover of claim 5 wherein the patch attached to the first flap has a loop pile fastening structure and wherein the second flap further includes a patch having a hook pile fastening structure fastened thereto.

9. An improved headrest cover for snugly covering a headrest having cylindrical post sections, the improvement comprising:
    a cover material defining a cylinder having a substantially rectangular cross section with an open end and a closed end, the cover material being shaped so as to snugly fit over the headrest when pulled thereover;
    a first flap extending from a first side of the open end of the cover material, the first flap having a pile fastening patch attached thereto;
    a second flap extending from a second side of the open end of the cover material so as to oppose and engage the first flap underneath the headrest between the cylindrical post sections;
    a first and second interior patch of material, each having a pile fastening structure and each fastened to the interior of the cover material; and
    a first and second strap extending from opposite ends of the open end of the seat cover material for wrapping around the cylindrical post sections, each of the straps having a patch with a pile fastening structure fastened thereto for engagement with the first and second interior patches, respectively.

* * * * *